United States Patent
Stimits et al.

(10) Patent No.: US 9,266,727 B2
(45) Date of Patent: Feb. 23, 2016

(54) HYDROGEN GAS GENERATOR

(75) Inventors: Jason L. Stimits, Avon, OH (US); Guanghong Zheng, Westlake, OH (US)

(73) Assignee: Intelligent Energy Limited, Loughborough (GB)

( * ) Notice: Subject to any disclaimer, the term of this patent is extended or adjusted under 35 U.S.C. 154(b) by 716 days.

(21) Appl. No.: 13/468,284

(22) Filed: May 10, 2012

(65) Prior Publication Data
US 2013/0004865 A1     Jan. 3, 2013

Related U.S. Application Data

(60) Provisional application No. 61/502,030, filed on Jun. 28, 2011.

(51) Int. Cl.
*H01M 8/06*     (2006.01)
*C01B 3/06*     (2006.01)
*B01J 7/02*     (2006.01)
(Continued)

(52) U.S. Cl.
CPC . *C01B 3/065* (2013.01); *B01J 7/02* (2013.01); *H01M 8/04208* (2013.01); *F17C 11/005* (2013.01); *Y02E 60/321* (2013.01); *Y02E 60/362* (2013.01); *Y02E 60/50* (2013.01)

(58) Field of Classification Search
CPC ........................... C01B 3/065; H01M 8/04208
USPC .............. 429/408, 411, 416, 417, 421; 48/61
See application file for complete search history.

(56) References Cited

U.S. PATENT DOCUMENTS

| | | |
|---|---|---|
| 6,645,651 B2 | 11/2003 | Hockaday et al. |
| 7,097,813 B2 | 8/2006 | Ord et al. |
| 7,105,033 B2 | 9/2006 | Strizki et al. |

(Continued)

FOREIGN PATENT DOCUMENTS

| | | |
|---|---|---|
| CN | 1798698 | 7/2006 |
| EP | 1306917 A2 | 5/2003 |

(Continued)

OTHER PUBLICATIONS

Patent Cooperation Treaty (PCT), International Search Report and Written Opinion for Application No. PCT/US2012/037219, filed May 10, 2012, mailed Aug. 23, 2012, European Patent Office, Netherlands.

(Continued)

*Primary Examiner* — Muhammad Siddiquee
(74) *Attorney, Agent, or Firm* — Baker Hostetler LLP; Mark H. Krietzman

(57) ABSTRACT

The invention is a hydrogen generator with a liquid reservoir, a reaction area, a byproduct containment area and a hydrogen containment area within a housing. A liquid from the liquid reservoir can react within the reaction area to produce hydrogen gas and byproducts, which flow to the byproduct containment area, and hydrogen gas passes into the hydrogen containment area and is released from the housing through a hydrogen outlet as needed. The liquid reservoir and the reaction area are each within a container made of a liquid impermeable material, the byproduct containment area is within a flexible container made of a hydrogen permeable, liquid impermeable material, and the hydrogen containment area is within a flexible container made of a hydrogen impermeable material. The byproduct containment area is in a volume exchanging relationship with one or both of the liquid reservoir and the reaction area.

25 Claims, 2 Drawing Sheets

(51) Int. Cl.
*H01M 8/04* (2006.01)
*F17C 11/00* (2006.01)

(56) References Cited

U.S. PATENT DOCUMENTS

| | | | |
|---|---|---|---|
| 7,172,825 | B2 | 2/2007 | Adams et al. |
| 7,316,718 | B2 | 1/2008 | Amendola et al. |
| 7,323,148 | B2 | 1/2008 | Shah et al. |
| 7,481,858 | B2 | 1/2009 | Rosenzweig et al. |
| 7,540,892 | B2 | 6/2009 | Strizki et al. |
| 7,674,540 | B2 | 3/2010 | Adams et al. |
| 2002/0182459 | A1 | 12/2002 | Hockaday et al. |
| 2003/0037487 | A1* | 2/2003 | Amendola et al. ............ 48/76 |
| 2003/0138679 | A1 | 7/2003 | Prased et al. |
| 2004/0048115 | A1 | 3/2004 | Devos |
| 2004/0148857 | A1* | 8/2004 | Strizki et al. ............ 48/127.9 |
| 2005/0158595 | A1 | 7/2005 | Marsh et al. |
| 2005/0238573 | A1 | 10/2005 | Zhang et al. |
| 2007/0020172 | A1* | 1/2007 | Withers-Kirby et al. .. 423/648.1 |
| 2007/0036711 | A1 | 2/2007 | Fisher et al. |
| 2007/0037034 | A1 | 2/2007 | Fisher et al. |
| 2008/0102024 | A1* | 5/2008 | Bae et al. .................. 423/648.1 |
| 2009/0113795 | A1 | 5/2009 | Eickhoff |
| 2009/0117423 | A1* | 5/2009 | Eickhoff .................. 429/19 |
| 2010/0092806 | A1 | 4/2010 | Peczalski et al. |
| 2010/0150824 | A1* | 6/2010 | Withers-Kirby et al. .. 423/648.1 |
| 2010/0279183 | A1 | 11/2010 | Ku et al. |
| 2011/0020215 | A1 | 1/2011 | Ryu et al. |
| 2011/0070151 | A1 | 3/2011 | Braithwaite et al. |
| 2011/0200495 | A1 | 8/2011 | Braithwaite et al. |
| 2012/0100443 | A1 | 4/2012 | Braithwaite et al. |

FOREIGN PATENT DOCUMENTS

| | | |
|---|---|---|
| EP | 1375419 A2 | 1/2004 |
| EP | 1901381 A2 | 3/2008 |
| JP | 2004-002914 A | 1/2004 |
| JP | 2005-071932 A | 3/2005 |
| JP | 2008-021514 A | 1/2008 |
| WO | 2010/035077 A1 | 4/2010 |
| WO | 2011/097198 A1 | 8/2011 |

OTHER PUBLICATIONS

CN Search Report dated Mar. 20, 2015, in CN201280042129.8.

* cited by examiner

HYDROGEN GAS GENERATOR

CROSS REFERENCE TO RELATED APPLICATION

This application claims the benefit of U.S. Provisional Application No. 61/502,030, filed Jun. 28, 2011.

FIELD OF THE INVENTION

This invention relates to a hydrogen gas generator, particularly a hydrogen generator for a fuel cell system.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the negative electrode side of the fuel cell. In other types of hydrogen fuel cells, hydrogen gas is supplied to the fuel cell from a source outside the fuel cell. A fuel cell system can include a fuel cell battery, including one or more fuel cells, and a hydrogen source, such as a fuel tank, a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts. An accelerator and/or a catalyst can be used to increase the rate of reaction or catalyze the reaction. When the reactants react, reaction products including hydrogen gas and byproducts are produced.

In order to minimize the volume of the hydrogen generator, volume that is initially occupied by the reactants can be used to accommodate reaction products as the reactants are consumed by arranging the components of the hydrogen generator in a volume exchanging configuration. As reactants are consumed, volume that they had occupied is simultaneously made available to contain reaction products.

The hydrogen gas is separated from byproducts and unreacted reactants, and the gas exits the hydrogen generator and is provided to the fuel cell battery. Various means for separating the hydrogen gas are known, including porous filters to separate solids from the hydrogen gas and gas permeable, liquid impermeable membranes to separate the hydrogen gas from liquids. Such means of separating the hydrogen gas can become filled or blocked by solids, thereby restricting or blocking the flow of hydrogen gas so the gas cannot exit the hydrogen generator.

It is desirable to provide a hydrogen generator capable of supplying hydrogen gas to a fuel cell stack with improved effectiveness and reliability of the separation of hydrogen gas from liquids and solids within the hydrogen generator. The hydrogen generator is advantageously less susceptible to internal restrictions or blockages that can impede the separation and release of the hydrogen gas. It is further desirable that the hydrogen generator have excellent reliability, safety, volume efficiency and a simple design that is easily manufactured at a low cost.

SUMMARY

The above objects are met and the above disadvantages of the prior art are overcome by a hydrogen generator and a fuel cell system as described below.

Accordingly, one aspect of the present invention is hydrogen generator including a housing; a liquid reservoir within the housing and including a liquid reactant container, made of a liquid impermeable material, and containing a liquid including a first reactant; a reaction area within the housing and including a reaction container, made of a liquid impermeable material, and within which the first reactant reacts to produce hydrogen gas and byproducts; a byproduct containment area within the housing and including a flexible byproduct container, made of a hydrogen permeable, liquid impermeable material through which solids and liquids cannot pass but through which hydrogen gas can pass; a hydrogen containment area within the housing and including a flexible hydrogen gas container, made of a hydrogen impermeable material, and configured to contain hydrogen gas from the byproduct containment area; and a hydrogen outlet from the hydrogen containment area through the housing. The byproduct containment area is in a volume exchanging relationship with at least one of the liquid reservoir and the reaction area.

The hydrogen generator can include one or more of the following features:
- the byproduct container material is an elastic material, capable of stretching and contracting;
- the byproduct container material includes a fluoropolymer; the fluoropolymer can include an expanded fluoropolymer; the fluoropolymer can include a polytetrafluoroethylene or a polytetrafluoroethylene derivative;
- the hydrogen containment container material includes a metallized polymer film or a metal-polymer composite film;
- a catalyst configured to catalyze the reaction of the first reactant is initially contained within the reaction area;
- a second reactant is initially contained within the reaction area; the second reactant can include a chemical hydride, preferably a metal hydride, more preferably sodium borohydride; the second reactant can be a solid; a solid pellet can include the second reactant; the solid pellet can further include a binder;
- the hydrogen generator includes an accelerant that is capable of providing an increased rate of reaction; the accelerant can include an acid;
- the reaction container includes an outlet through which hydrogen gas and byproducts can exit to the product containment area;
- the hydrogen generator further includes a pump configured to pump the liquid from the liquid reservoir to the reaction area; the pump can be disposed within the hydrogen generator; and a liquid dispersion device is disposed within the reaction chamber.

Another aspect of the invention is a fuel cell system including a fuel cell stack and a hydrogen generator as described above. The hydrogen generator can be removable for the rest of the fuel cell system.

These and other features, advantages and objects of the present invention will be further understood and appreciated by those skilled in the art by reference to the following specification, claims and appended drawings.

Unless otherwise specified, the following definitions and methods are used herein:

"effluent" means non-gaseous reaction products and unreacted reactants, solvents and additives;

"expand" when used in describing a filter means for the filter material to simultaneously increase in volume, increase in porosity and decrease in density and pertains only to the material of which the filter is made;

"initial" means the condition of a hydrogen generator in an unused or fresh (e.g., refilled) state, before initiating a reaction to generate hydrogen;

"volume exchanging relationship" means a relationship between two or more areas or containers within a hydrogen generator such that a quantity of volume lost by one or more of the areas or containers is simultaneously gained by one or more of the other areas or containers; the volume thus exchanged is not necessarily the same physical space, so volume lost in one place can be gained in another place.

Unless otherwise specified herein, all disclosed characteristics and ranges are as determined at room temperature (20-25° C.).

DESCRIPTION

Figure 1:
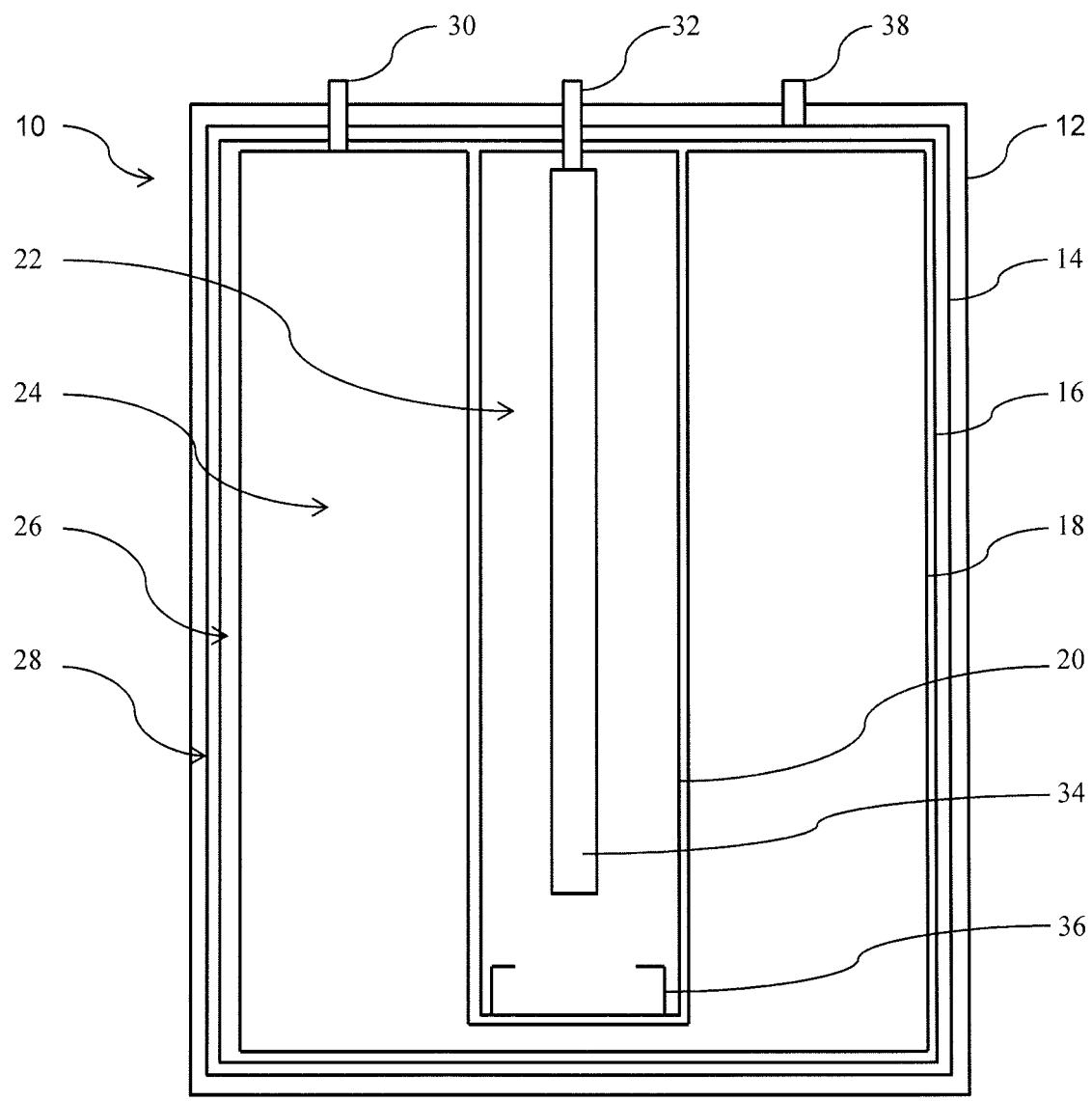
FIG. 1 is a schematic cross-sectional drawing of a hydrogen gas generator in an initial state.

A hydrogen generator according to an embodiment of the present invention includes reactants that can react to produce hydrogen gas. One or more reactants are contained in a liquid stored in a reservoir within the housing. The liquid is essentially stable within the reservoir. The liquid is transferred to a reaction area, where the reactants react. If all reactants are contained in the liquid, reaction can be initiated by one or a combination of methods, such as contact with a catalyst, changing the pH of the liquid or heating the liquid. Alternatively, at least one reactant can be located elsewhere in the hydrogen generator. For example, if the other reactant(s) are contained in another liquid, the other liquid can be stored in another reservoir and be transferred to the reaction area to react with the first liquid, or the other liquid can be stored in the reaction area. If the other reactant(s) are in solid form, they can be stored within the reaction area.

When the reactants react, hydrogen gas and byproducts are produced in the reaction area and flow to the byproduct containment area. Some unreacted reactants can be carried to the byproduct containment area by the flow of hydrogen gas and byproducts. To minimize the amount of unreacted reactants in the byproduct containment area, a screen or other type of filter can be located near the exit from the reaction area to help retain particles of solid reactants within the reaction area, or additional liquid reactant can be transferred to the byproduct containment area or an intermediate area to react with unreacted reactants carried from the reaction area. Unreacted reactants can also continue to react within the byproduct containment area. A catalyst or accelerant can be included in the byproduct containment area to promote reaction of any unreacted reactants present.

During use of the hydrogen generator, reactants stored in reservoirs and reaction area are depleted so less volume is required for those areas. If the containers for those areas can become smaller as the contents are depleted (e.g., by collapsing or shrinking), the volume vacated by those areas becomes available to accommodate the increasing volume of the byproduct containment area, which has an expanding container. The byproduct container is made of a gas permeable and liquid impermeable to allow hydrogen gas but not liquids and solids in the byproduct containment area to pass therethrough, so that the gas is separated from the liquids and solids. Gas passing through the byproduct container is collected within the hydrogen containment area, which is contained within a container made of a hydrogen impermeable material until released through an outlet through the hydrogen generator housing.

A volume exchange between the product containment area and at least one of the liquid reservoir and the reaction area provides good volume efficiency, so that the total volume of the hydrogen generator does not have to be large enough to hold the sum of the volumes of the reactants plus byproducts, and the hydrogen generator can be made as small as possible.

Because the hydrogen containment area is essentially hermetically sealed within the hydrogen gas container, the hydrogen gas container can provide improved resistance to hydrogen gas leakage from the hydrogen generator, the housing may not have to be made of a hydrogen impermeable material, and the housing does not necessarily have to be hermetically sealed. This allows for the use of many different types of materials for the housing, allows the use of other housing sealing methods, and can simplify the hydrogen generator manufacturing process. Materials can be selected based on other desirable properties such as low cost, high strength, heat resistance, moldability, workability, and so on without regard to hydrogen impermeability. Examples of materials that may be considered include plastics (e.g., polyphenylene sulfides such as RYTON® (Boedeker Plastics), polysulfones such as polyphenylsolfone, polysulfone and polyethersulfone, glass reinforced plastics such as glass fiber reinforced polyacrylamides such as IXEF® (Solvay Advanced Polymers), ceramics (e.g., silicon carbide, kaolinite and glass) and combinations thereof (e.g., metal lined plastic). The container can also be closed using fasteners, such as screws, rivets, nuts and bolts, clips, clamps, and so on, which may not be suitable if a hermetic seal is required, and the use of additional sealants, caulking, gaskets and so on may not be necessary. The container can also be closed using methods that may be capable of providing a hermetic seal, but without the process controls, etc., that may be necessary to insure the seal is hermetic. A separate container for the hydrogen containment area also facilitates reuse of the hydrogen generator, since the contents of a used hydrogen generator can be readily removed and replaced.

Hydrogen gas can be provided by the hydrogen generator to a hydrogen consuming apparatus such as a hydrogen fuel cell stack. The hydrogen consuming apparatus and the hydrogen generator can be incorporated into a system that includes controls for controlling the transfer of liquid from the liquid reservoir to the reaction area of the hydrogen generator.

The hydrogen generator can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene).

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

As used herein, the term "chemical hydride" is broadly intended to be any hydride capable of reacting with a liquid to produce hydrogen. Examples of chemical hydrides that are suitable for use in the hydrogen generating apparatus described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. Chemical hydrides that are soluble in water can be included in the liquid reactant composition, particularly at alkaline pH to make the liquid sufficiently stable. The reaction can be initiated by contacting the chemical hydride solution with a catalyst, lowering the pH (e.g., with an acid), and/or heating. Chemical hydrides can be stored as a solid, and water can be added. A catalyst or acid can be included in the solid or liquid composition.

One or more catalysts can be used to catalyze the hydrogen producing reactions. Examples of suitable catalysts include transition metals from Groups 8 to 12 of the Periodic Table of the Elements, as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making thermal adjustments. The rate of hydrogen generation can be controlled to match the need for hydrogen gas. A control system can be used for this purpose, and the control system can be within or at least partially outside the hydrogen generator.

Additives can be used for various purposes. For example, one or more additives can be included with a solid reactant as a binder to hold the solid material in a desired shape or as a lubricant to facilitate the process of forming the desired shape. Other additives can be included with a liquid or solid reactant composition to control pH. Such additives include but are not limited to acids (e.g., hydrochloric, nitric, sulfuric, citric, carbonic, boric, carboxylic, sulfonic, malic, phosphoric, succinic and acetic acids or combinations thereof), or bases (e.g., hydroxides such as those of Group 1 elements, ammonium, and organic compounds; metal oxides such as those of Group 1 metals; and organic and metal amines). Additives such as alcohols and polyethylene glycol based compounds can be used to prevent freezing of the fluid. Additives such as surfactants, wetting agents and anti-foaming agents (e.g., glycols, polyglycols and polyols) can be used to control the liquid surface tension and reaction product viscosity to facilitate the flow of hydrogen gas and/or effluents. Additives such as porous fibers (e.g., polyvinyl alcohol and rayon fibers) can help maintain the porosity of a solid reactant component and facilitate even distribution of the reactant-containing fluid and/or the flow of hydrogen and effluents.

In one embodiment a chemical hydride such as sodium borohydride (SBH) is one reactant, and water is another reactant. The chemical hydride can be a component of a liquid such as water. The chemical hydride and water can react when they are exposed to a catalyst, an acid or heat in the reaction chamber. Alternatively, the chemical hydride can be stored as a solid in the reaction area, as essentially loose granules or powder or formed into a desired shape, for example. If an increased rate of reaction between the chemical hydride and the water is desired, a solid acid, such as malic acid, can be mixed with the chemical hydride, or acid can be added to the water. A chemical hydride can be formed into a mass, such as a block, tablet or pellet, to reduce the amount of unreacted chemical hydride contained in the effluent that exits the reaction area. As used below, "pellet" refers to a mass of any suitable shape or size into which a solid reactant and other optional ingredients are formed. The pellet should be shaped so that it will provide a large contact surface area between the solid and liquid reactants. In an example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent), up to about 3 weight percent silica (anti-caking agent) and/or up to about 3 weight percent powder processing rheology aids can be included. The density of the pellet can be adjusted, depending in part on the desired volume of hydrogen and the maximum rate at which hydrogen is to be produced. A high density is desired to produce a large amount of hydrogen from a given volume, but high porosity enables a higher rate of hydrogen generation. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed.

It may be desirable to provide for cooling of the hydrogen generator during use, since the hydrogen generation reactions can produce heat. The housing may be designed to provide coolant channels. In one embodiment standoff ribs can be provided on one or more external surfaces of the housing and/or interfacial surfaces with the fuel cell system or device in or on which the hydrogen generator is installed or mounted for use. In another embodiment the hydrogen generator can include an external jacket around the housing, with coolant channels between the housing and external jacket. Any suitable coolant can be used, such as water or air. The coolant can flow by convection or by other means such as pumping or blowing. Materials can be selected and/or structures, such as fins, can be added to the hydrogen generator to facilitate heat transfer.

It may also be desirable to provide means for heating the hydrogen generator, particularly at startup and/or during operation at low temperatures.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump liquid from the reservoir to the reaction area, an external connection that functions as a fluid reactant composition outlet to the pump can also be used to refill the hydrogen generator with fresh liquid. Filling ports can also be advantageous when assembling a new hydrogen generator, whether it is disposable or refillable. If the hydrogen generator is disposable, it can be advantageous to dispose components with life expectancies greater than that of the hydrogen generator externally, such as in a fuel cell system or an electric appliance, especially when those components are expensive.

The liquid reservoir, reaction area, byproduct containment area and hydrogen containment area can be arranged in many different ways. By arranging the byproduct containment area in a volume exchanging relationship with one or both of the liquid reservoir and the reaction area, the hydrogen generator can be more volume efficient and provide a greater amount of hydrogen per unit of volume of the hydrogen generator. Other considerations in arranging the components of the hydrogen generator include thermal management (adequate heat for the desired reaction rate and dissipation of heat generated by the reactions), the desired locations of external connections (e.g., for hydrogen gas, liquid flow to and from an external pump), any necessary electrical connections (e.g., for pressure and temperature monitoring and control of fluid reactant flow rate), and ease of assembly.

Liquid containing a reactant is initially disposed in the liquid reservoir, which is bounded by a container. The container is made of a liquid impermeable material that is stable in the environment of the hydrogen generator (e.g., nonreactive with the contents of the reservoir). It can be either gas impermeable or gas permeable. A gas permeable container can allow small amounts of hydrogen that may be formed within the liquid reservoir to escape. While the container could be a rigid container, a flexible container can become smaller (e.g., by collapsing and/or contracting) as liquid is transferred out of the reservoir, so that space initially occupied by the reservoir can be made available to an enlarging byproduct containment area. Examples of types of flexible containers include containers with walls having accordion folds, similar to a bellows; elastic containers that can stretch and contract in response to changes in pressure like a balloon; and containers made of nonelastic materials that are not rigid but also do not stretch or contract to a great extent. Examples of flexible, films include polyethylene, polypropylene, polyvinylchloride, rubber, latex, silicone, nylon, Viton, polyurethane, neoprene, buna-N, polytetrafluoroethylene, expanded polytetrafluoroethylene, perfluoroelastomers, and fluorosilicone. Of these, rubber, latex, silicone, Viton, neoprene, buna-N and perfluoroelastomers are generally elastic, as well as some polyvinylchloride and polyurethane films. All of these films are hydrogen permeable to at least some degree, and most are also generally liquid impermeable.

Liquid is transferred from the liquid reservoir to the reaction area. This can be done by one or more methods, including pressurizing the container and/or the liquid within the container, wicking the liquid to the reaction area and pumping the liquid. Pressure can be applied to the liquid or the liquid reactant container with a pressurized gas within or outside the liquid reactant container or a biasing component such as a spring, compressed rubber or compressed foam for example. Liquid can be wicked from one area to another by a material that is readily wetted by and can transport the liquid by capillary action. The wicking material can extend along the entire liquid transfer path from within the liquid reservoir to within the reaction area or along only a portion of the liquid transfer path. A wicking component can be made of, coated or lined with, or filled with the wicking material. When the liquid includes water, the wicking material can be a hydrophilic material such as cotton, polyester or nylon, for example. Liquid can also be pumped from the liquid reservoir to the reaction area using one or more pumps, which can be within or outside the hydrogen generator. Pumps are preferably as small as possible while being able to pump sufficient liquid for the hydrogen generator to supply hydrogen gas at the maximum desired rate. Locating pumps outside the hydrogen generator can allow more space for reactants within the housing and can reduce the total cost of a system with a disposable hydrogen generator. Examples of types of pumps that may be suitable include rotary, screw, piston, diaphragm, peristaltic pumps, centrifugal, radial flow, axial flow and impedance pumps.

The reaction area can be an area in which reactants come in contact with each other and/or with one or more reaction initiators such as catalysts, acid or heat, and in which the reactants react to produce hydrogen gas. As described above, all reactants may be included in one or more liquids, or one or more solid reactants can be initially stored within the reaction area. The reaction area is an area within the reaction container, which can be a rigid or flexible container, as described above for the liquid reactant container. With a flexible container the reaction area can participate in volume exchange with the byproduct containment area by becoming smaller as reactants initially stored within the reaction area are consumed. In addition, force applied to the reactants in a reaction area within a flexible container can facilitate good contact among reactants, reaction initiators and additives, as well as help to move hydrogen gas and byproducts out of the reaction area toward the byproduct containment area, to achieve good reactant utilization and hydrogen generation efficiency. In an embodiment, a solid reactant and optional additives are formed into a solid pellet that is initially disposed within the reaction area; a liquid including another reactant is transported to the reaction area, where it contacts the pellet, and a hydrogen generating reaction occurs. The reaction container in this embodiment can include an elastic material that is initially stretched and applies force against the pellet to minimize space between the pellet where liquid reactant and byproducts can accumulate. An elastic, flexible or non-elastic container can be wrapped with an elastic material (e.g., an elastic film or band) or biased by one or more springs or other biasing members.

A liquid disperser can be used to improve distribution of liquid within the reaction area. For example, the liquid disperser can include features such as one or more nozzles (e.g., spray nozzles), a tubular structure with one or multiple branches and multiple liquid outlets, a wicking member that can wick liquid over a large surface in contact with another reactant in the reaction area, and combinations thereof.

The reaction container includes an outlet from which hydrogen gas and byproducts (gases, fluids and solids) can exit the reaction area. The outlet can be just an opening in the reaction chamber, an additional structure incorporated into the container wall, a screen or filter to retain large solid particles within the reaction area, a valve or a combination thereof.

Unreacted reactants can be carried out of the reaction area by hydrogen gas and byproducts exiting therefrom. These reactants may continue to react after leaving the reaction area, e.g., in the byproduct containment area. This produces additional hydrogen gas and contributes to the total volume of hydrogen that the hydrogen generator produces. In order to maximize the possible hydrogen output, it can be advantageous to transport some of the liquid from the liquid reservoir to an area outside the reaction area (e.g., to a portion of the byproduct containment area or an intermediate area between the reaction and byproduct containment areas). This can be especially beneficial when unreacted reactants include solid particles, particularly if there is insufficient unreacted liquid reactant present.

Hydrogen gas and byproducts from the reaction area enter the byproduct containment area, which has a byproduct container made of a material that is liquid impermeable but permeable to at least hydrogen gas. Preferably the container is flexible so that it initially encloses a small volume but expands to contain byproducts. The container can be similar to those described above for the reaction area and the liquid reservoir, as long as it is liquid impermeable and hydrogen permeable. Preferably the container has a sufficient hydrogen permeability to allow hydrogen gas to enter the hydrogen containment area at a rate adequate to meet the hydrogen gas demand. Because liquids and solids will not permeate the container, the container separates hydrogen gas from liquids and solids that enter the byproduct containment area. The byproduct container can have a large surface area to both provide a higher rate of hydrogen gas entry into the hydrogen containment area. The large surface area is also useful in preventing blockage of hydrogen transmission through the container due to accumulation of solids on the inner surface of the byproduct container. This is especially advantageous when byproduct and/or unreacted reactants can form a crust that can tend to restrict the transmission of hydrogen gas. Movement of a flexible container can also serve to fracture and/or strip accumulated solids as the byproduct containment area enlarges. It can also be advantageous for the byproduct container to be elastic to further contribute to breaking and removing solids from the surface of the container. The initial size of the byproduct containment area can be established based on factors such as the initial volume of liquid in the liquid reservoir, the initial volume of reactants and additives in the reaction area and the volume of byproducts that may be produced (the volume of the byproducts may be greater than the combined volume of the reactants).

To reduce the accumulation of solids on the inner surface of the byproduct container, one or more additional filters can be disposed in the byproduct containment area to remove a portion of the solids as the effluent from the reaction area passes through the byproduct containment area to the surface of the container. A series of filters can be used and arranged so the larger particles will be removed first. For example, the general flow path through the byproduct containment area may be through a coarser, more porous filter first, followed by successively finer, less porous filters, to prevent clogging of the filters. Filters with high stability, low reactivity with the effluent from the reaction area are preferred. Some types of filters can also be initially compressed and expand as the byproduct containment area expands, contributing to the volume efficiency of the hydrogen generator or being less resistant to clogging. Filters can be made of materials such as nylon, polytetrafluoroethylene, polyolefins, carbon and other materials.

Hydrogen gas that passes through the byproduct container enters the hydrogen containment area, which is sealed within a hydrogen gas container made of a hydrogen impermeable material. The hydrogen gas container serves as a reservoir for hydrogen gas that is generated but not yet released from the hydrogen generator. This provides a buffer that can initially contain a small amount of hydrogen gas that can be provided before sufficient hydrogen has been produced during initial use and following subsequent startups. The hydrogen containment area can also contain hydrogen gas produced during periods when the release of hydrogen gas is halted, between stopping the transfer of liquid to the reaction area and the time at which reactants already in the reaction area (and byproduct containment area) are consumed and generation of hydrogen gas is halted. The size of the hydrogen containment area can be established based on factors such as the types of reactants used, the rate of hydrogen gas production, the volume of byproducts produced, the rate at which hydrogen gas is to be supplied and the amount of hydrogen gas desired to be available at startups.

The hydrogen gas container is impermeable with respect to hydrogen gas, thereby preventing leakage of hydrogen gas through the hydrogen generator housing, without requiring the walls of the housing to be impermeable with respect to hydrogen gas and the housing to be hermetically sealed. The internal hydrogen gas container can provide a redundant gas seal, adding to the safety and reliability of the hydrogen generator. Hydrogen impermeable materials include metallized polymeric films and metal-polymeric composite films such as laminates with polymeric and metal layers. Examples of suitable polymeric films include polyethyleneterephalate, polyvinylchloride, polyethylene, polycarbonate, polyimide, polypropylene and polyamide. Examples of suitable metals include aluminum, chromium, nickel and gold. An adhesive can be included on surfaces of the material that are sealed to make a sealed container. The entire inner surface can be a layer of material that can function as an adhesive. For example, polyethylene can be heat sealed. A preferred type of material is a laminate including three or more layers, with the middle layer being a metal and the outer layer being polymeric layers.

The hydrogen gas container encloses both the byproduct containment area and the reaction area. All hydrogen gas produced in the reaction area or downstream therefrom passes through the hydrogen gas container so the hydrogen gas is effectively separated from liquids and solids. The liquid reservoir can be disposed outside or within the hydrogen gas container. It can be advantageous for the liquid reservoir to be within the hydrogen gas container, especially if the liquid contains a hydrogen source that can react during periods of nonuse to produce small amounts of hydrogen gas, since this hydrogen gas can also be captured within the hydrogen gas container, thereby maximizing the hydrogen gas output from the hydrogen generator.

Hydrogen gas exits the hydrogen containment area through an outlet. The hydrogen gas container can be sealed to the outlet. The outlet can include one or more valves to seal the hydrogen generator when it is not providing hydrogen and to allow hydrogen to exit the hydrogen generator when desired.

Some reactants may contain or produce gaseous byproducts, and it may be desirable to remove these gases, especially if they can damage the hydrogen consuming apparatus being supplied with hydrogen. This may require additional filters, etc., either within the hydrogen generator or elsewhere in the system.

The hydrogen generator can include other features, such as a pressure relief mechanism to safely release excessive internal pressure due to an abnormal condition.

The generation of hydrogen gas can be started and stopped by starting and stopping the transfer of liquid from the liquid reservoir to the reaction area. This can be done manually (e.g., with a manually operated switch) or automatically. Automatic operation can be accomplished with a control system, which can be disposed within or outside the hydrogen generator, or a combination thereof. Control can be based on the demand for hydrogen, e.g., for a fuel cell system. In a fuel cell system, demand can be determined by monitoring and/or communicating with the fuel cell stack, an electric appliance being powered by the stack, a battery being charged by the stack, and so on.

The hydrogen generator can include thermal controls. For example, heat can be applied to assist in initiating the reaction, particularly at startup and when the ambient temperature is low. The hydrogen generator can be cooled if necessary to remove excess heat generated in the hydrogen generating reaction. Heating and cooling can be done by a variety of methods, including air convection, circulation of heating and cooling fluids, electrical heaters, and so on. A thermal control system can also include temperature monitors, etc. The thermal control system may be disposed within or outside the hydrogen generator, or a combination.

Figure 2:
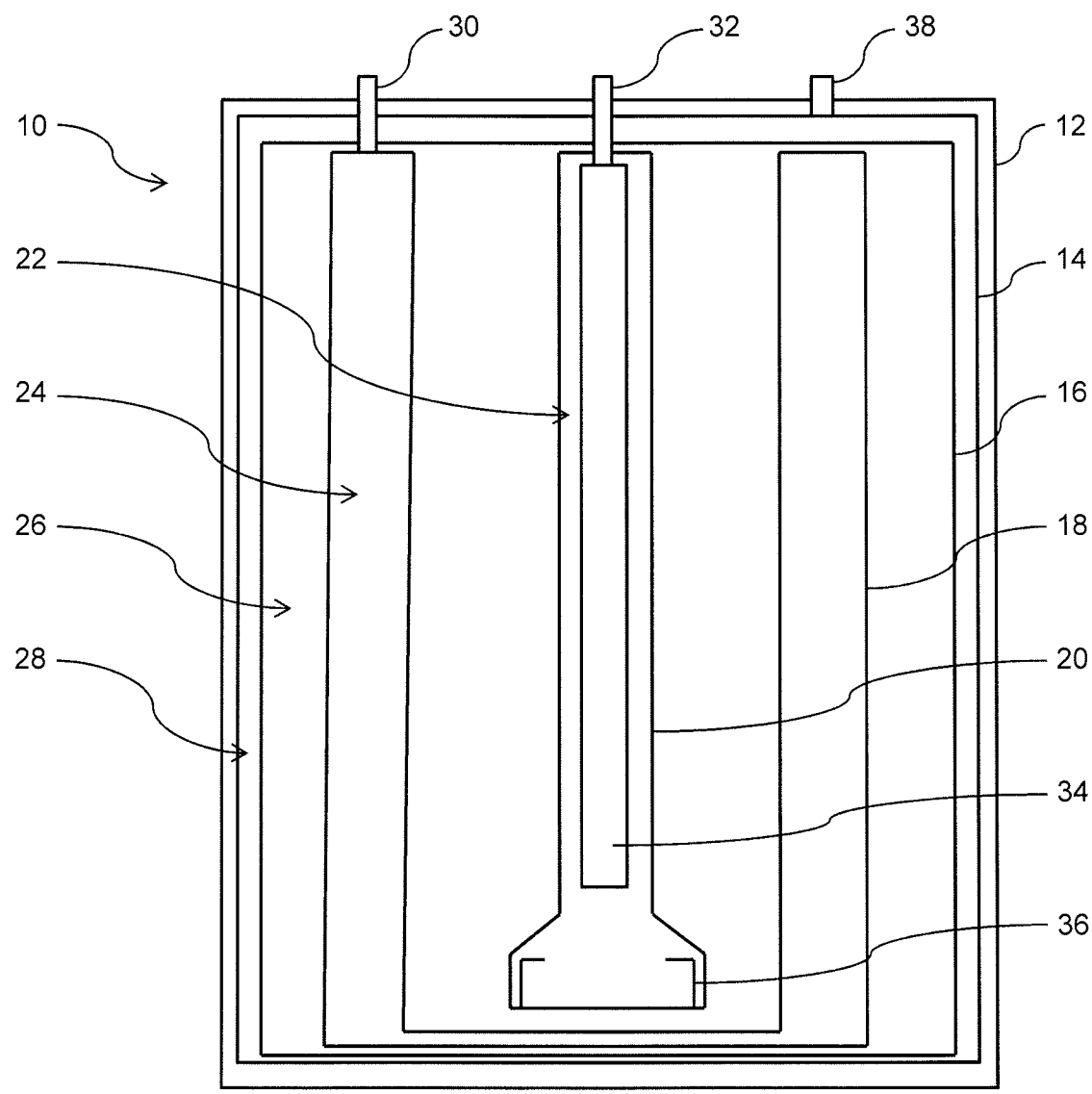
FIG. 2 is a schematic cross-sectional drawing of the hydrogen gas generator in FIG. 1 in a subsequent state.

A hydrogen generator according to an embodiment is shown in FIGS. 1 and 2. The embodiment shown can be further modified according to the above description, to include variations in such things as the types and initial locations of reactants; the size, shape and relative locations of individual components; and the incorporation of optional features and components into the hydrogen generator. FIG. 1 is a schematic representation of a hydrogen generator 10 in an initial condition, before use, and FIG. 2 is a schematic representation of the hydrogen generator 10 after at least partial use. The hydrogen generator 10 includes a housing 12. Within the housing 12 is a reaction area 22 within a reaction container 20 and a liquid reservoir 24 within a liquid reactant container 20. A liquid containing a reactant such as water is initially contained in the liquid reservoir 24. The liquid can also contain another reactant, such as a chemical hydride dissolved therein, in which case reaction between the water and the chemical hydride is initiated within the reaction area 22 after a quantity of the liquid is transferred from the liquid reservoir 24 to the reaction area 22. Alternatively, another reactant can be contained in a second liquid, initially contained within either the reaction area 22 or a second liquid reservoir (not shown) from which it is transferred to the reaction area 22; or a solid containing a reactant can be initially contained within the reaction area 22, in the form of one or more pellets for example. Liquid is transferred from the liquid reservoir 24 to the reaction area 22, where reactants react to produce hydrogen gas and byproducts. Liquid can be transferred from the liquid reservoir 24 via an internal flow path (not shown) or via an external flow path from the liquid reservoir 24, through a liquid reactant outlet 30 to a portion of the flow path outside the hydrogen generator 10, back into the hydrogen generator 10 through a liquid reactant inlet 32 and into the reaction area 22. The liquid can be dispersed within the reaction area 22 by a liquid disperser 34. The reactants react within the reaction area 22, and hydrogen gas and reaction byproducts that are produced exit the reaction area 22 through a reaction area outlet 36 and enter a byproduct containment area 26 within a byproduct container 16. The byproduct container 16 is liquid impermeable and hydrogen permeable so liquids and solids remain within the byproduct containment area 26, while hydrogen gas passes through the byproduct container 16 into the hydrogen containment area 28. Hydrogen gas is released from the hydrogen generator 10 as needed, through a hydrogen gas outlet 38.

The byproduct containment area 26 can be in a volume exchanging relationship with one or both of the liquid reservoir 24 and the reaction area 22, as shown in FIG. 2. As the hydrogen generator 10 is used, liquid is transferred from the liquid reservoir 24 and hydrogen gas and byproducts exit the reaction area 22. Flexible containers 20 and 18 can allow these areas to become smaller in volume, with a concurrent increase in the volume of the byproduct containment area 26. Initially the byproduct containment area 26 can be very small, or it can be larger to accommodate a larger anticipated volume of byproducts. The byproduct containment area 26 can be in a volume exchanging relationship with the hydrogen containment area 28, if, for example, the byproduct container 16 is flexible and able to move in response to changes in the relative pressures applied by the contents of the byproduct containment area 26 and the hydrogen containment area 28.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
    a housing;
    a liquid reservoir within the housing and comprising a liquid reactant container, made of a liquid impermeable material, and containing a liquid comprising a first reactant;
    a reaction area within the housing and comprising a reaction container, made of a liquid impermeable material, and within which the first reactant reacts to produce hydrogen gas and byproducts;
    a byproduct containment area within the housing and comprising a flexible byproduct container, made of a hydrogen permeable, liquid impermeable material through which solids and liquids cannot pass but through which hydrogen gas can pass;
    a hydrogen containment area within the housing and comprising a flexible hydrogen gas container, made of a hydrogen impermeable material, and configured to contain hydrogen gas from the byproduct containment area; and
    a hydrogen outlet from the hydrogen containment area through the housing;
    wherein the byproduct containment area is in a volume exchanging relationship with at least one of the liquid reservoir and the reaction area; and
    wherein the hydrogen containment area and the byproduct containment area being separated by a common wall comprising the hydrogen permeable, liquid impermeable material so as to allow the passage of hydrogen from the byproduct containment area to the hydrogen containment area.

2. The hydrogen generator according to claim 1, wherein the byproduct container material is an elastic material, capable of stretching and contracting.

3. The hydrogen generator according to claim 1, wherein the byproduct container material comprises a fluoropolymer.

4. The hydrogen generator according to claim 3, wherein the fluoropolymer comprises an expanded fluoropolymer.

5. The hydrogen generator according to claim 4, wherein the fluoropolymer comprises polytetrafluoroethylene or a polytetrafluoroethylene derivative.

6. The hydrogen generator according to claim 1, wherein the hydrogen containment container material comprises a metallized polymer film or a metal-polymer composite film.

7. The hydrogen generator according to claim 1, wherein a catalyst configured to catalyze the reaction of the first reactant is initially contained within the reaction area.

8. The hydrogen generator according to claim 1, wherein a second reactant is initially contained within the reaction area.

9. The hydrogen generator according to claim 8, wherein the second reactant comprises a chemical hydride.

10. The hydrogen generator according to claim 8, wherein the second reactant is a solid.

11. The hydrogen generator according to claim 10, wherein a solid pellet comprises the second reactant.

12. The hydrogen generator according to claim 11, wherein the solid pellet further comprises a binder.

13. The hydrogen generator according to claim 8, wherein the hydrogen generator comprises an accelerant that is capable of providing an increased rate of reaction.

14. The hydrogen generator according to claim 13, wherein the accelerant comprises an acid.

15. The hydrogen generator according to claim 1, wherein the reaction container comprises an outlet through which hydrogen gas and byproducts can exit to the product containment area.

16. The hydrogen generator according to claim 1, wherein the hydrogen generator further comprises a pump configured to pump the liquid from the liquid reservoir to the reaction area.

17. The hydrogen generator according to claim 16, wherein the pump is disposed within the hydrogen generator.

18. The hydrogen generator according to claim 1, wherein a liquid dispersion device is disposed within the reaction chamber.

19. A fuel cell system comprising a fuel cell stack and a hydrogen generator according to claim 1.

20. The fuel cell system according to claim 10, wherein the hydrogen generator is removable from the rest of the fuel cell system.

21. A hydrogen generator of claim 1, wherein the reaction area is contained within the byproduct containment area, the hydrogen containment area, or both the byproduct and hydrogen containment areas.

22. A hydrogen generator of claim 8, wherein the second reactant comprises a metal hydride.

23. A hydrogen generator of claim 8, wherein the second reactant comprises sodium borohydride.

24. A hydrogen generator comprising:
    a housing;
    a liquid reservoir within the housing and comprising a liquid reactant container, made of a liquid impermeable material, and containing a liquid comprising a first reactant;
    a reaction area within the housing and comprising a reaction container, made of a liquid impermeable material, and within which the first reactant reacts to produce hydrogen gas and byproducts;
    a byproduct containment area within the housing and comprising a flexible byproduct container, made of a hydrogen permeable, liquid impermeable material through which solids and liquids cannot pass but through which hydrogen gas can pass;
    a hydrogen containment area within the housing and comprising a flexible hydrogen gas container, made of a hydrogen impermeable material, and configured to contain hydrogen gas from the byproduct containment area; and
    a hydrogen outlet from the hydrogen containment area through the housing;
    wherein the byproduct containment area is in a volume exchanging relationship with at least one of the liquid reservoir and the reaction area;
    wherein the flexible hydrogen gas container encloses both the flexible byproduct container and the reaction container.

25. The hydrogen generator of claim 24, wherein
    the byproduct containment area contains the liquid reservoir and the reaction area; and
    the hydrogen containment area contains the byproduct containment area.

* * * * *